US005509083A

United States Patent [19]
Abtahi et al.

[11] Patent Number: 5,509,083
[45] Date of Patent: Apr. 16, 1996

[54] METHOD AND APPARATUS FOR CONFIRMING THE IDENTITY OF AN INDIVIDUAL PRESENTING AN IDENTIFICATION CARD

[75] Inventors: Nooral S. Abtahi, 4924 Carmel Rd., Charlotte, N.C. 28226; Grady C. Shumate, Sr., Charlotte, N.C.; Waddie Heyward, Charlotte, N.C.; Hedong Yang, Charlotte, N.C.

[73] Assignee: Nooral S. Abtahi, Charlotte, N.C.

[21] Appl. No.: 259,879

[22] Filed: Jun. 15, 1994

[51] Int. Cl.$^6$ ........................................... G06K 9/00
[52] U.S. Cl. .................... 382/124; 340/825.34; 235/380
[58] Field of Search ................................ 382/2, 4, 5, 30, 382/124, 125, 126, 127, 209; 340/825.3, 825.31, 825.33, 825.34; 356/71; 235/380, 382, 382.5; 283/74, 75, 78, 82

[56] References Cited

U.S. PATENT DOCUMENTS

| | | | |
|---|---|---|---|
| 4,210,899 | 7/1980 | Swonger et al. | 340/146.3 E |
| 4,537,484 | 8/1985 | Fowler et al. | 354/62 |
| 4,581,760 | 4/1986 | Shiller et al. | 382/4 |
| 4,784,484 | 11/1988 | Jensen | 356/71 |
| 4,790,566 | 12/1988 | Boissier et al. | 283/91 |
| 4,805,223 | 2/1989 | Denyer | 382/4 |
| 4,821,118 | 4/1989 | Lafreniere | 358/108 |
| 4,876,725 | 10/1989 | Tomko | 382/4 |
| 4,930,814 | 6/1990 | Nusmeier | 283/109 |
| 4,931,629 | 6/1990 | Frankfurt | 235/488 |
| 4,933,976 | 6/1990 | Fishbine et al. | 382/4 |
| 4,947,442 | 8/1990 | Tanaka et al. | 382/5 |
| 4,947,443 | 8/1990 | Costello | 382/5 |
| 4,975,969 | 12/1990 | Tal | 382/2 |
| 4,993,068 | 2/1991 | Piosenka et al. | 380/23 |
| 4,995,086 | 2/1991 | Lilley et al. | 382/4 |
| 5,067,162 | 11/1991 | Driscoll, Jr. et al. | 382/5 |
| 5,105,467 | 4/1992 | Kim et al. | 382/4 |
| 5,144,680 | 9/1992 | Kobayashi et al. | 382/4 |
| 5,175,775 | 12/1992 | Iwaki et al. | 382/31 |
| 5,239,590 | 8/1993 | Yamamoto | 382/4 |

FOREIGN PATENT DOCUMENTS

| | | | |
|---|---|---|---|
| 0251504 | 1/1988 | European Pat. Off. | 382/4 |
| 2256170 | 12/1992 | United Kingdom | 382/4 |
| 91/06920 | 5/1991 | WIPO | 382/4 |
| 94/10659 | 5/1994 | WIPO | 382/4 |

OTHER PUBLICATIONS

Randall C. Fowler, *IEEE Spectrum;* "Fingerprint: an old touchstone decriminalized," Feb. 1994; p. 26.

Vanessa O'Connell; *Money;* "Your Money Monitor;" Apr. 1994; pp. 36, 37, 39.

Holland, "Stalking the Credit–Card Scamsters," *Business Week,* Jan. 17, 1994, pp. 68–69, Abstract only.

Churbuck, "Don't Leave Headquarters Without it," *Forbes,* vol. 152, No. 14, Dec. 20, 1993, pp. 242–243, abstract only.

Stahl, "Fighting Fraud," *Savings and Community Banker,* vol. 2, No. 11, Nov. 1993, p. 44, abstract only.

(List continued on next page.)

*Primary Examiner*—Leo Boudreau
*Assistant Examiner*—Andrew W. Johns
*Attorney, Agent, or Firm*—Ralph H. Dougherty; Scott E. Hanf

[57] ABSTRACT

A system for confirming the identity of an individual presenting an identification card includes a card reader, an associated central processing unit, a preselected feature template library associated with the central processing unit, a scanner for scanning preselected portions of an epidermis, such as a fingerprint, RAM storage means operatively associated with the central processing unit and the scanner, a communication interface such as a modem communicating with a remote site, and an output display indicating the identifier correlation. This invention provides an improved method of verifying that a card holder is the card owner by matching the image of the card holder's fingerprint to the unique code which has been assigned to the card owner and encoded on the card's magnetic strip, which requires only a relatively small amount of data to perform identification, making it possible to use low cost, low density encoding methods including bar code and magnetic strip. Fingerprint verification apparatus is also disclosed.

20 Claims, 6 Drawing Sheets

OTHER PUBLICATIONS

Arend, "New Card Fraud Weapons Emerge," *ABA Banking Journal*, vol. 85, No. 9, Sep. 1993, pp. 91–98, abstract only.

"Another Fraud Battle for Neural Nets," *Credit Card Management*, vol. 6, No. 6, Sep. 1993 pp. 12–13, abstract only.

Coscia, *PR Newswire*, "Visa Starts Testing New Anti-Counterfeit Technologies," Nov. 2, 1993.

Wichner, *The Phoenix Gazette*, "B of A To Put Customers' Mugs on Cards," Oct. 28, 1993, sect. D, p. 1.

De Maio, *Providence Business News*, "How To Catch a (Credit Card) Thief," Oct. 11, 1993, sect. 1, p. 1.

Amatos, *Columbus Dispatch*, "Picture on Card Might Stop Fraud, Banks Say," Sep. 14, 1993, Business sect.

Cummins, *Newsday*, "High-tech War on Crime: Fight Against Credit-Card Fraud Requires Latest Weapons," Jul. 7, 1993, sect. 1, p. 35.

Fehr–Snyder, *The Phoenix Gazette*, "Protect Your Plastic: Credit Card Fraud Costs Billions," Jul. 5, 1993, sect E, p.1.

Calbreath, *San Francisco Business Times*, "Visa International Cracks Down on Credit Card Fraud," May 14, 1993, sect. 1, p. 3.

Wood, *Journal Inquirer*, "State Warns Consumers: Platinum no Pot of Gold," Mar. 4, 1993, business sect.

*Mesa Tribune*, "Bank 1 Designs Cards to Stem Fraud," Aug. 28, 1993, business sect.

*Scottsdale Progress*, "Bank 1 Designs Cards to Stem Fraud," Aug. 28, 1993, business sect.

Kaberline, *Kansas City Business Journal*, "Officials Halt Credit Card Scheme out of Loan Shop," Aug. 13, 1993, section 1, p.1.

Calbreath, *San Francisco Business Times*, "Visa Fraud Squad Swoops Down on Bay Area," Aug. 13, 1993, sect. 1, p. 3.

Leuchter, *Crains New York Business*, "Customers Say Cheese: Citibank Steps up Marketing of Photocard," Feb. 8, 1993, sect. 1, p.2.

Gellene, *Los Angeles Times*, "Court Orders Halt to Sale of 'Free' Credit Cards," Dec. 22, 1992, sect. D, p. 2.

Wichner, *The Phoenix Gazette*, "Multilevel Marketer Target of State Suit Alleging Fraud," Dec. 22, 1992, sect. B, p. 3.

Taylor, *Mesa Tribune*, "State Targeting California Firm: Investigators Suspect Insurance Credit Offers Is 'Pyramid' Scam," Dec. 10, 1992, business sect.

Edwards, *San Diego Business Journal*, "Neural Networks: They're Intelligent but Not Smart," Dec. 7, 1992, Sect. 1, p. 15.

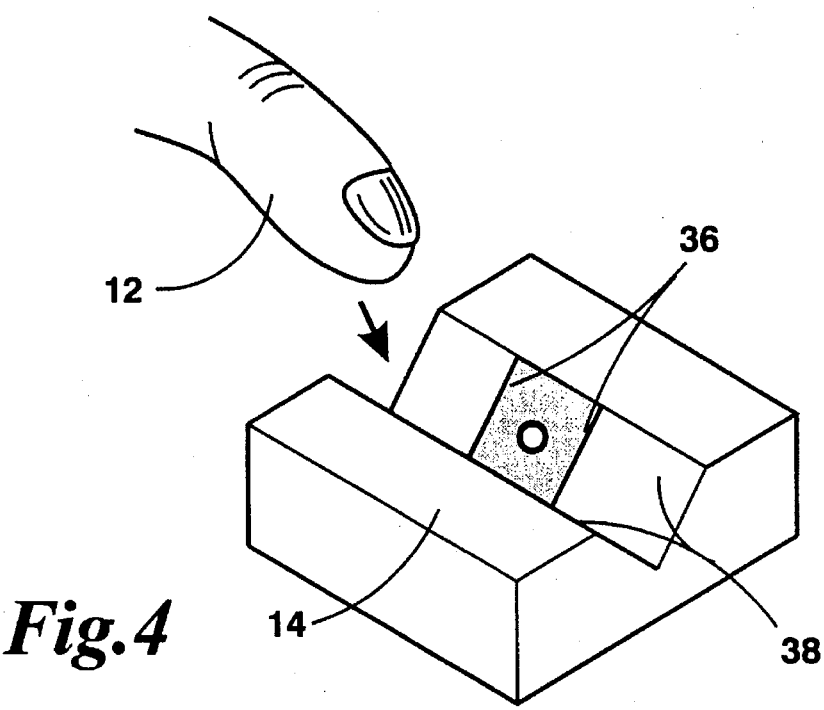
Fig.4
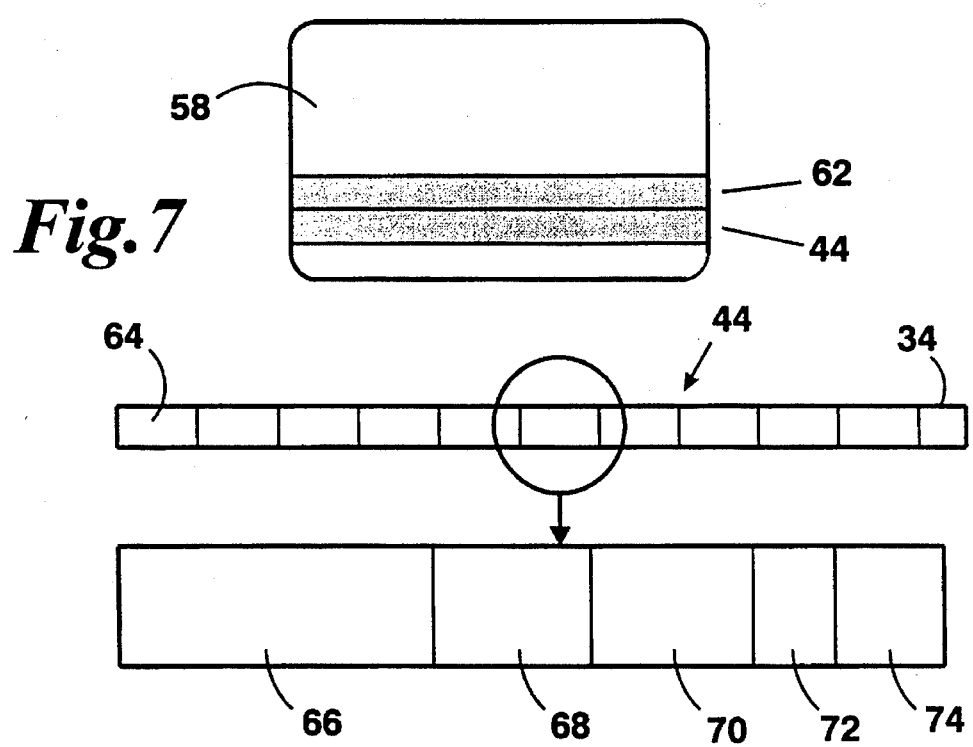
Fig.7
Fig.8

000    001    010    011    100    101    110    111

METHOD AND APPARATUS FOR CONFIRMING THE IDENTITY OF AN INDIVIDUAL PRESENTING AN IDENTIFICATION CARD

FIELD OF THE INVENTION

The present invention relates to a fraud proof credit or identification card system, in which the fingerprint of the cardholder is optically or magnetically encoded on an information strip on the card. The system compares information from the card against a fingerprint scan of the person who is tendering the card and generates approval or disapproval of the sales or other transaction based on the correlation between the information encoded on the card and the fingerprint of the person tendering the card.

BACKGROUND OF THE INVENTION

Credit card fraud is a serious problem which is growing rapidly each year. Experts estimate that credit card fraud in the United States cost close to one billion dollars in 1993, which is a significant increase from the eight hundred sixty four million dollars in fraud loss for 1992.

Currently, there are several different types of credit card fraud. The first and most obvious type is when a card is stolen from the cardholder and then is used to make purchases either by phone or in person. The second type of fraud is where information is gathered from a cardholder and a fake credit card is produced, sometimes only with cardboard and a piece of magnetic tape on which the information is inscribed so that the user may withdraw funds from an automatic teller machine (ATM) through use of this counterfeit card. Of increasing sophistication is the counterfeiter's duplication of a card which is virtually indistinguishable from the cardholder's card with information obtained about a specific cardholder's account. Often this is done where a merchant or an employee of the merchant copies vital information about a cardholder's account and then uses it or sells it to a person who then produces the counterfeit cards. In this case, the cardholder may not even have lost his credit card but receives bills for items that he never purchased. If the cardholder fails to report these fraudulent purchases with this type of counterfeit card immediately, he may be liable for the purchases.

Credit card companies have increased their search for ways to discourage credit card fraud in the 1980's. Visa and Mastercard introduced holograms on their cards which they claimed would make the credit card harder to reproduce. However, counterfeit cards have been flowing into the United States from the Far East, where duplication of the credit card company's cards occurs right down to the holographic image on the front of the card. CitiBank, which uses Visa and Mastercard more than any other bank in the United States, has introduced another new device for deterring fraud, consisting of a photo ID on the credit card. All of these methods will arguably protect against some specific types of credit card fraud, such as where credit cards are stolen from the actual cardholder. These methods may help to deter some fraudulent use of the card. However, as the perpetrators of credit card fraud increase their sophistication, it is not unrealistic to suspect that the people issuing counterfeit credit cards could easily place a photograph of a different person on the counterfeit card, which would allow fraudulent charges with ease by someone other than the actual cardholder. Additionally, in the ATM setting, there is still no way to curtail the fraudulent procurement of cash advance funds by someone other than the actual cardholder because no clerk is present to make a visual determination of whether the person using the card matches the photograph on the card.

Therefore, a need exists for a more sophisticated anti-fraud card which will effectively deter fraudulent withdrawal of funds from an automatic teller machine, as well as fraudulent purchases from manned areas.

DESCRIPTION OF THE PRIOR ART

Applicants are aware of the following U.S. Patents concerning anti-theft chargecards and fingerprint verification devices.

| U.S. Pat. No. | Inventor | Issue Date | Title |
| --- | --- | --- | --- |
| 4,537,484 | Fowler et al. | 08-27-1985 | FINGERPRINT IMAGING APPARATUS |
| 4,784,484 | Jensen | 11-14-1988 | METHOD AND APPARATUS FOR AUTOMATIC SCANNING OF FINGERPRINTS |
| 4,790,566 | Boissier et al. | 12-13-1988 | IDENTITY DOCUMENT DIFFICULT TO FALSIFY AND A PROCESS FOR MANUFACTURING SUCH A DOCUMENT |
| 4,805,223 | Denyer | 02-14-1989 | SKIN-PATTERN RECOGNITION METHOD AND DEVICE |
| 4,821,118 | Lafreniere | 04-11-1989 | VIDEO IMAGE SYSTEM FOR PERSONAL IDENTIFICATION |
| 4,876,725 | Tomko | 10-24-1989 | METHOD AND APPARATUS FOR FINGERPRINT VERIFICATION |
| 4,930,814 | Nusmeier | 06-05-1990 | IDENTITY CARD |
| 4,931,629 | Frankfurt | 06-05-1990 | SECURITY CREDIT CARD |
| 4,947,442 | Tanaka et al. | 08-07-1990 | METHOD AND APPARATUS FOR MATCHING FINGERPRINTS |
| 4,947,443 | Costello | 08-07-1990 | METHOD AND APPARATUS FOR VERIFYING IDENTITY |
| 5,067,162 | Driscoll, Jr. et al. | 11-19-1991 | METHOD AND APPARATUS FOR VERIFYING IDENTITY USING IMAGE CORRELATION |
| 5,105,467 | Kim et al. | 04-14-1992 | METHOD OF FINGERPRINT VERIFICATION |
| 5,175,775 | Iwaki et al. | 12-29-1992 | OPTICAL PATTERN RECOGNITION USING MULTIPLE REFERENCE IMAGES |
| 5,239,590 | Yamamoto | 08-24-1993 | FINGERPRINT VERIFICATION METHOD |

Fowler U.S. Pat. No. 4,537,484 provides apparatus for scanning a fingerprint, through the use of mirrors, an optical element, and light, by optical scanning of a fingerprint side of a finger. A fingerprint imaging apparatus is disclosed. The apparatus includes a rigid frame with a carriage rotatably mounted on the frame. A transparent optical element for receiving a finger to be imaged is secured to the frame. The optical element is preferably made of plastic and has a partial cylindrical cross-section which provides a recess for receiving the finger.

Jensen U.S. Pat. No. 4,784,484 provides apparatus for automatic scanning of a fingerprint by optical scanning of a fingerprint side of a finger. When the finger is placed in contact with this device, an electrical/optical scanning occurs.

Boissier et al. U.S. Pat. No. 4,790,566 provides an identity document which is difficult to falsify. The document has graphical information on a support, the surface of which is broken down into a network of macropixels. Each of the macropixels contains a dot matrix pattern of two different levels of light absorption which reproduces a portion of the uncoded specific information of the document on a microscopic scale.

Denyer U.S. Pat. No. 4,805,223 discloses a method and device for recognizing a skin pattern of an individual to authenticate the person. The device takes a currently taken skin pattern and produces it on a contact surface. The image is compared to a previously stored skin pattern and the degree of coincidences therebetween are assessed.

Lafreniere U.S. Pat. No. 4,821,118 provides a video image system which records a video image of the person's hand palm and face along with the ID card that may be a badge, card, drivers license, passport, or other item issued by some authority. The system provides a designated place entered by the individual so that their palm, ID card and face may be scanned and recorded for later inspection.

Tomko U.S. Pat. No. 4,876,725 provides a device for fingerprint verification. The individual places two fingers on a surface and an optical image is created. Said optical image is compared to a stored holographic image of the person's two fingerprints, to determine if a match exists. The length and width of the person's two fingers is also compared.

Nusmeier U.S. Pat. No. 4,930,814 provides an identity card, comprising of synthetic material. The identity card provides information essential for the identification of the user. The synthetic material contains sublimatable coloring agents dissolved in and bound to the material.

Frankfurt U.S. Pat. No. 4,931,629 provides an unique credit card, which can be registered to a person and is as unique as a fingerprint. A preferred embodiment of the invention provides a credit card with distinctive gems retained within it. If the distinctiveness of the gems do not match with the name of the proper holder, fraudulent possession is detected.

Tanaka et al. U.S. Patent provides a method and apparatus for matching fingerprints, in which the collation rate is improved by using both characteristic and non-characteristic minutia for the collation process. This process improves security.

Costello U.S. Pat. No. 4,947,443 provides a method and apparatus for verifying the identity of a person by comparing the record of topographically natural physical characteristics on a friction skin surface to an individual. The record includes a data package of machine readable codings relating to the type, orientation, and location of that characteristic.

Driscoll, Jr. et al. U.S. Pat. No. 5,067,162 provides a method and apparatus for verification of personnel identity by correlation of fingerprint images. First, a reference record is created to enroll the individual into the system. Second, the individual presents the verification, and the reference record is recalled from the system to compare the individual and the reference record. The image data contained in the reference record contains a plurality of reference systems where the image data is distinct relative to the image surrounding the reference section.

The scanned image is divided up into areas and then each area is correlated with every area around it to determine the uniqueness of that area. If there is a high correlation with any of the regions around it, then it is not a good candidate. If it gets low correlation with all the areas around it, then it is unique. This image will be stored and kept as a possible candidate to use for identification. A number of these candidates are saved as the actual images to form a template on a disk or some other type of storage device. So unlike the present invention, Driscoll teaches the actual physical storage of segments of a processed finger print to be used for identification purposes.

Kim et al. U.S. Pat. No. 5,105,467 provides a method of comparing a direction pattern of an input fingerprint to a direction pattern of a registered fingerprint. The input and registered fingerprints are considered matched if the direction difference is lower than the lower threshold value. If the direction difference is between the upper and lower threshold values, further processing occurs. If the direction difference is higher than the upper threshold value, the fingerprints are considered to be different.

Iwaki et al. U.S. Pat. No. 5,175,775 teaches a method of optical pattern recognition which compares a plurality of reference images and at least one single image to produce correlation peaks. First, a plurality of initial groups with a given number of individual reference images. This process is repeated several times to form a final correlated group to determine a particular reference image corresponding to the object image.

Yamamoto U.S. Pat. No. 5,239,590 teaches a method of verifying a sample image of a fingerprint is that of a specific individual through comparison of sample data to master data. Both images have been divided into several blocks and further divided into several block areas. Each block area has several pixels each having an associated direction. The fingerprint verification is determined by at least one of total dispersion, cross-correlation, and distance between classes.

SUMMARY OF THE INVENTION

A magnetic strip card based, fingerprint verification system that utilizes a standardized fingerprint feature template library for identification purposes. By using a standardized template library the speed of identification is greatly increased while lowering the cost of the system. This system performs two primary verification tasks. First, the system verifies that the card user is the card owner by matching the image of the card holder's fingerprint to the unique code which has been assigned to the card owner and encoded on the card's magnetic strip. Secondly, the system verifies that the account specified by the magnetic strip is assigned to the card owner. The system can have many applications, including credit card fraud prevention. The advantage of this system over known systems is the small data amount required to perform identification. This makes it possible to use low cost, low density encoding methods including a bar code and a magnetic strip.

OBJECTS OF THE INVENTION

The principal object of the invention is to provide an improved method of verifying that a card holder is the card owner by matching the image of the card holder's fingerprint to the unique code which has been derived from a fingerprint taken previously from the same finger and assigned to the card owner and encoded on the card's magnetic strip.

A further object of this invention is to provide a method of fingerprint verification which only requires a relatively small amount of data to perform identification, making it possible to use low cost, low density recording methods including a bar code and a magnetic strip.

Another object of the invention is to provide apparatus for fingerprint verification which provide quick and accurate identification.

Another object of the invention is to provide a method of fingerprint verification which records selective information that enables unique identification even with an enormous number of subjects.

BRIEF DESCRIPTION OF THE DRAWINGS

FIG. 4 is an isometric view of the Fingerprint Imaging Device.

FIG. 7 is a rear view of the card, showing the location of the Fingerprint record information.

FIG. 8 is an enlargement of the magnetic strip of the Identification card illustrating the format of the Fingerprint record information.

DETAILED DESCRIPTION

The present invention is a magnetic strip card based fingerprint verification system where the primary system processes are enrollment and verification. The verification process, which is diagramed in FIG. 1, encompasses matching a scanned fingerprint image with information encoded on a magnetic strip on an identification card, and then verifying this information with records at a remote location. An enrollment process, diagramed in FIG. 2, selects and records the fingerprint information to be encoded on the back of the card and at a remote location to be used in the verification process. System hardware, diagramed in Figure 3, comprises a fingerprint imaging device, and a microprocessor or central processing unit 124 with memory, display 40, and control interfaces 138.

Figure 1:
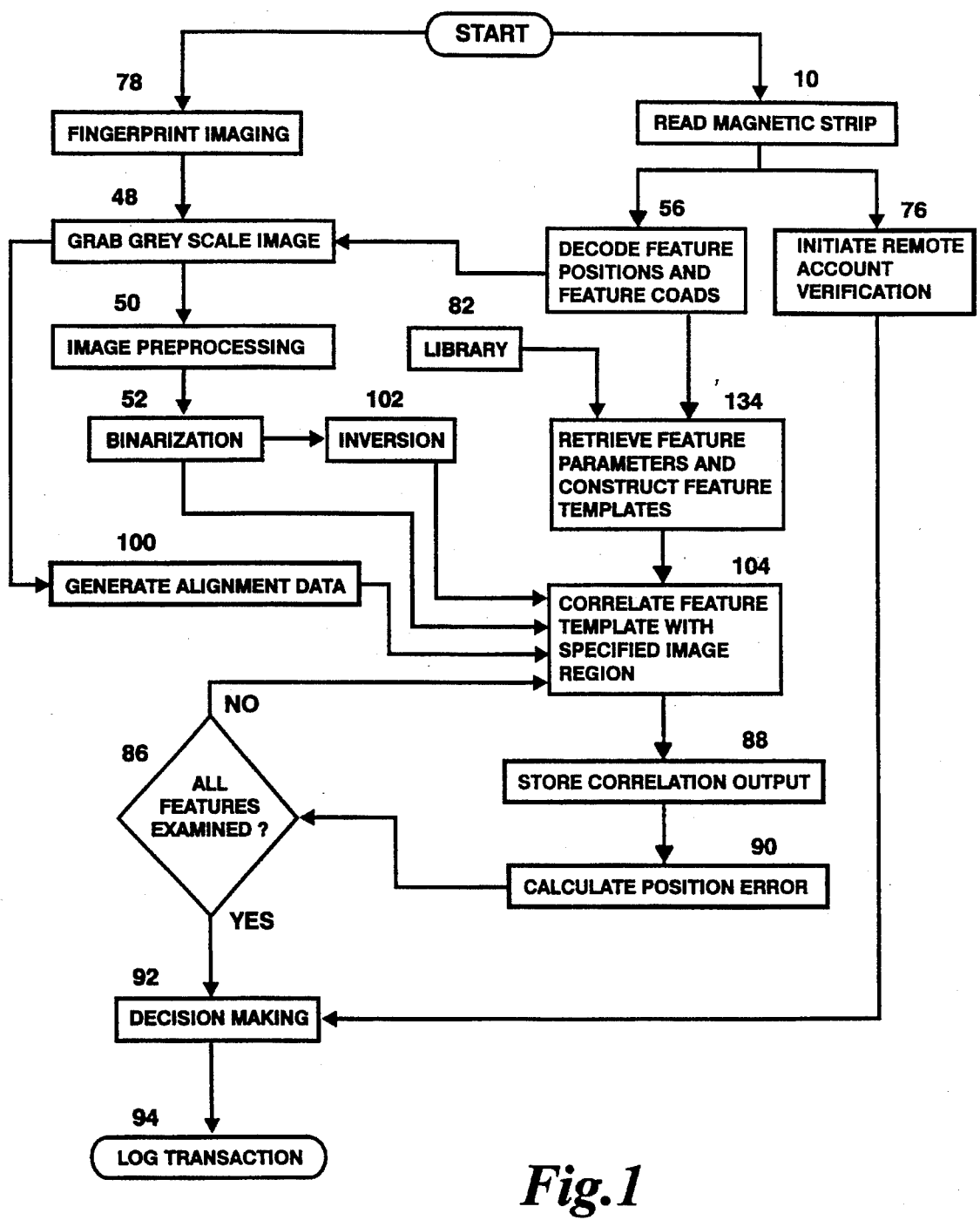
FIG. 1 is a detailed flow chart of the Verification Process.
Figure 5:
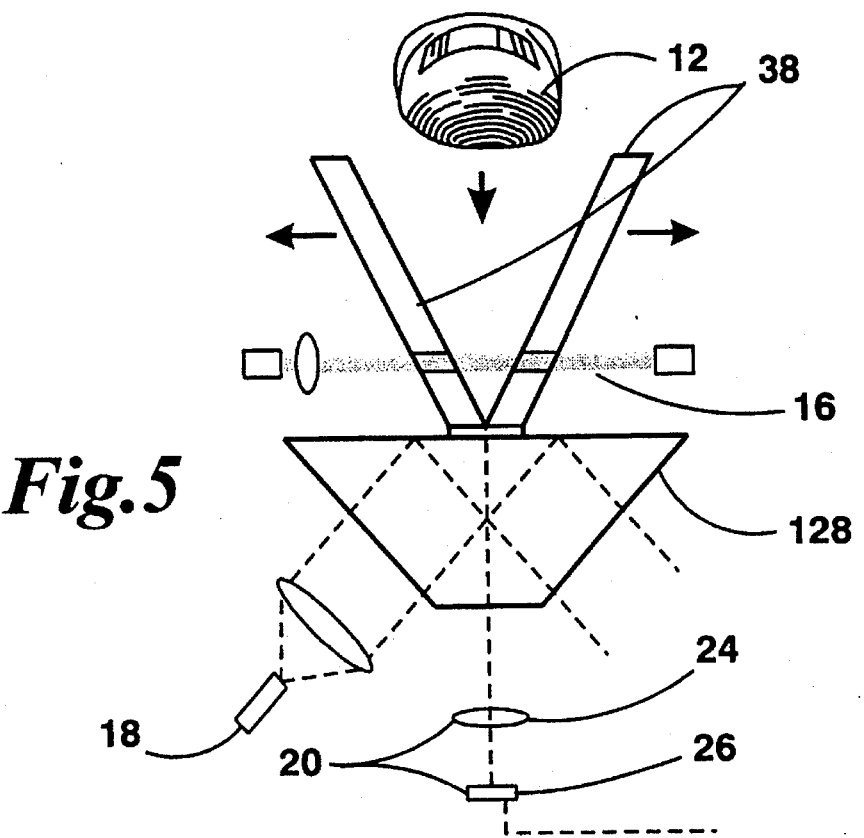
FIG. 5 is a front cross sectional view of the Fingerprint Imaging Device showing the finger outside of the cradle.

Verification is initiated when a card with a magnetic strip is fed into the card reader, 10, FIG. 1, and the presence of a finger 12, FIG. 4, in the finger cradle 14 is sensed through the blocking of the infrared detecting beam 16, FIG. 5, that goes from one side wall of the cradle to the other, as shown in FIG. 5. The light source 18, image capture device or charged coupling device (CCD) camera 20 and the card reader 22 are then activated (the light source may stay on all the time if a low power device, for example a LED, is used.) The image capturing and preprocessing is performed in parallel with the decoding of the magnetic strip data and remote account verification.

The user's finger should be placed in the cradle according to the external alignment marks 36, FIG. 4, on the side walls of the cradle 14, which is shown in FIG. 4. The image of the fingerprint is formed by the imaging optics in conjunction with the CCD camera 20, as shown in FIG. 5. The CCD camera's position can be adjusted by a stepper motor 28, FIG. 3, relative to the prism 128 in order to scan the image for the presence of the first "finger crease" 30, which is used as the alignment reference in the correlation process to ensure that the same portion of the fingerprint is imaged and used in both the enrollment and verification processes. A central processing unit 124 controls the stepper motor 28 via a position detector 140. The crease 30 is easily identified as a huge valley area in the lower portion of the fingerprint image. If the finger crease 30, cannot be found in the image range of the CCD camera 20, a message and/or LED signal will be displayed 40 indicating the improper positioning of the finger. The user is prompted to re-position his/her finger following the instructions. The positioning process is repeated until the crease is successfully located. The system then uses the 2-byte 'C' part 34 of the fingerprint record 42 decoded from the magnetic strip 44 to determine the Y-position of the portion of the fingerprint image that was used in the enrollment process. The system positions the CCD camera 20 using the stepper motor 28 to obtain an image centered on this Y-position. Three successive images are then grabbed at about 30 ms intervals. The 3 images are stored in processor RAM. Each image is preferably a 512×512 pixel array with each pixel value is specified by an 8-bit binary code. A code of all zeros represents black. A code of all ones represents white. Other values represent various shades of grey.

The image consists of an array of square pixels. Each pixel occupies a unique location in the array. Each location can be specified by its x and y coordinates where x varies from side to side across the array and y varies up and down along the array. Further compensation for alignment error is realized through system software, however a rough alignment of the finger is required. This rough alignment is guaranteed by the finger cradle 14 hardware and system software as described in the following paragraphs.

The lateral center of the image is established by the finger cradle walls 38 which separate equal distances as the finger is pressed down into place. This guarantees lateral centering of the finger. Some lateral shift of the fingerprint features can occur if the finger is rotated and then inserted so that the contact side of the finger is not facing directly downward. Small lateral shifts are automatically compensated for by the system software, however excessive rotation of the finger will shift the image beyond the range of the system. When this occurs the individual is prompted by the system to reposition his/her finger with the proper orientation.

The vertical center of the image is established by determining the distance between the first finger crease 30 and the center of the image area of the encoding system. During the enrollment process, the microprocessor analyzes the image for presence of the crease 30. If it is not found, the system activates the stepper motor 28 to reposition the CCD camera 20 in the y-direction until the crease 30 is found. Once found, the system calculates the distance between the crease and the center of the original image area. This distance is encoded onto the magnetic strip 44 for use by verification systems. When an individual presents a finger for verification, the verification system locates the first finger crease 30 in the same manner as the encoding system. Once located, the verification system then uses the encoded distance value to reposition the CCD camera 20 in the y-direction to the same relative area as was used for encoding.

Figure 2:
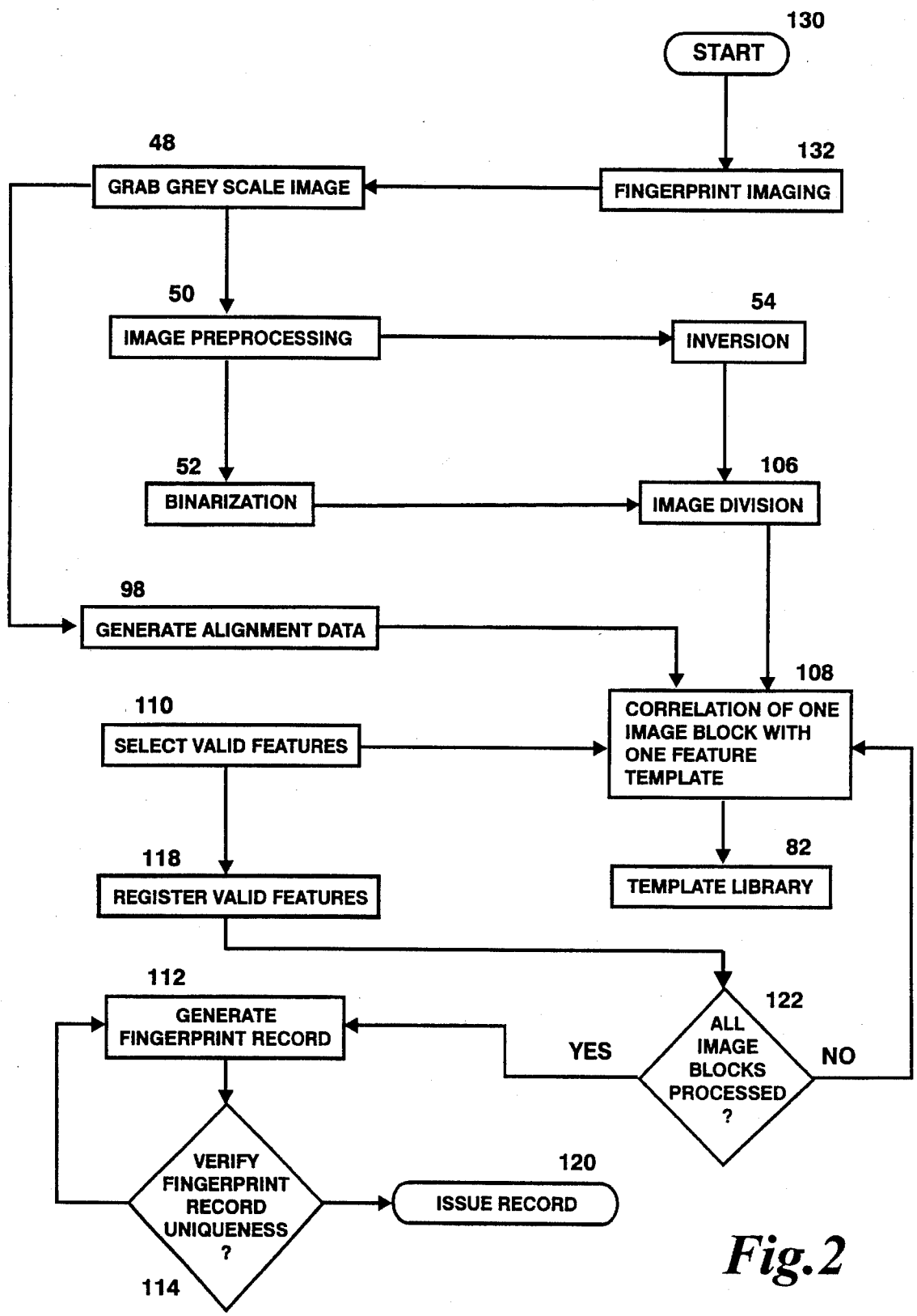
FIG. 2 is a detailed flow chart of the Enrollment Process.
Figure 3:
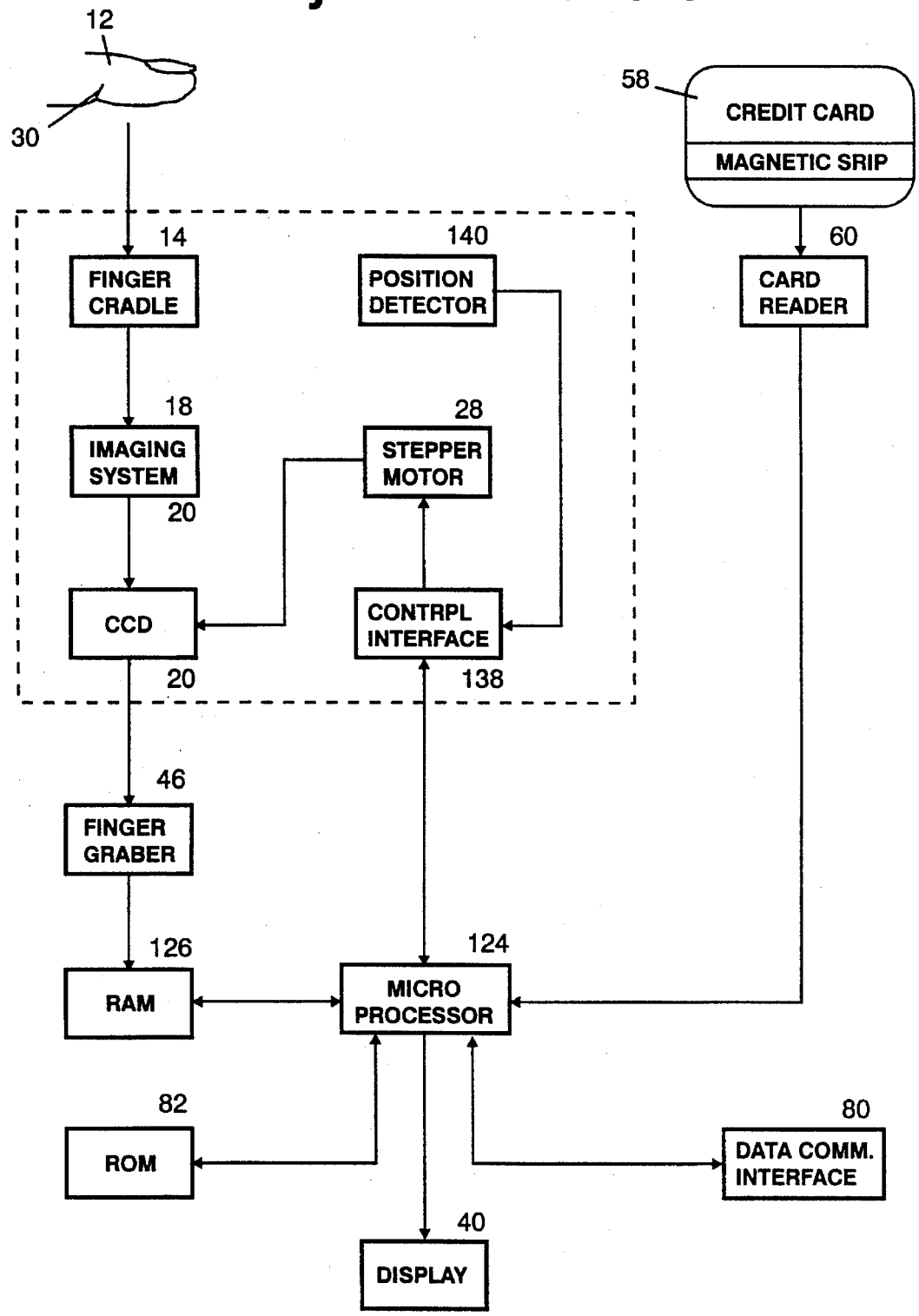
FIG. 3 is a detailed functional block diagram of the System Hardware.
Figure 9A:
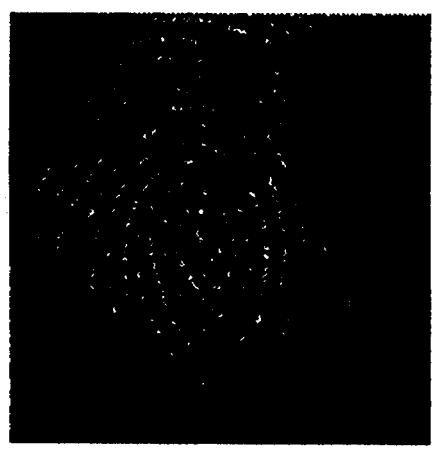
FIG. 9a an enlargement of a scanned fingerprint image.
Figure 9B:
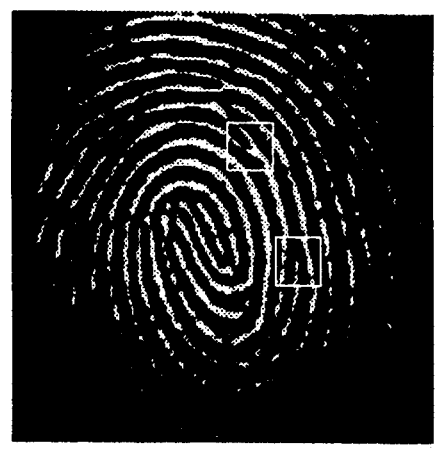
FIG. 9b is the scanned fingerprint image from 9a after it has been enhanced identifying two features for potential consideration.
Figure 9C:
FIG. 9c is the scanned fingerprint image from 9b after it has been binarized identifying a feature for potential consideration.
Figure 9D:
FIG. 9d is the scanned binarized fingerprint image from 9c after it has been inversed identifying a feature for potential consideration.

The grabbed images 48, FIG. 2, in RAM (one example is shown in FIG. 9a) are preprocessed 50 which includes averaging to reduce random noise. A non-linear operation is then performed on the averaged image to increase the contrast ratio and enhance the edges of the gray level image. FIG. 9b shows one example of the processed image. The contrast enhanced image is then binarized 52 by selecting a threshold value and assigning all pixels with values below the threshold a new value of zero and all pixels at or above the threshold a value of one, as shown in FIG. 9c. An inverted copy 54 of the binarized image is also produced, as shown in FIG. 9d. Both copies are stored. An alternative binarization process with thinning effect may be used, which involves two thresholds, one for ridges and the other for valleys of the grey level image. In the direct copy, the pixels with a value greater than the ridge threshold are assigned one while all other pixels are assigned zero; in the inverted copy, the pixels with a value less than the valley threshold are assigned one and all the other pixels are assigned zero.

Decoding of the magnetic strip 56 is performed in parallel with image capture and preprocessing 50. Magnetic strip decoding begins when the card 58, FIG. 3, (a credit card or identification card) is passed through the card reader device 60. The card reader device senses the magnetic flux reversals encoded on the magnetic strip and outputs a corresponding digital signal stream of 1's and 0's according to the flux reversal pattern written on the magnetic strip. Two pieces of information are read in from the magnetic strip. One is the fingerprint record 44 of the card owner, which has the format shown in FIG. 6 and is previously assigned to the card owner by the card issuer, the other is the name and the account number of the card owner 62.

The data format for the fingerprint record is illustrated in FIG. 7. Each record consists of a number (which can be 10 or more) of feature frames 64. Each feature frame 64 contains 5 bytes of data: a 16-bit feature code 66, which is the address code for the corresponding feature template in the feature library, 18 bits for the X position 68, and 18 bits for the Y position 70, at which a high correlation value is expected between the fingerprint image and the feature template pointed by the 16-bit feature code. Bit 34 is used as the inversion flag 72 indicating if the feature is a ridge pattern or a valley pattern. The remaining five bits are reserved 74. If a larger library is needed more bits can be assigned to the feature code. The 'C' part 34, which is the last two bytes in a record 44, represents the distance from the first finger crease 30 to the center of the portion of the fingerprint that was used in the enrollment process. The total length of one fingerprint record is fifty two bytes. A longer length can be used if more than ten frames are needed. The data encoded onto the magnetic strip 44 may be encrypted for additional security, however, the deciphered data format would be unchanged.

Remote account verification 76, FIG. 1, is performed in parallel with image capture 78 and preprocessing 50. Remote account verification 76 begins when the card 58 is passed through the reader device 60. Retrieved feature parameters 134 and other information read off the card's magnetic strip 44 and 62 is transmitted via the data communications interface 80 to a remote system to validate the name, account number and the matching fingerprint record, which are stored as a file for the card owner in the remote system database. This prevents a valid fingerprint record from being used to access a different account. The local fingerprint matching continues while the remote validation is in process. If the account is not validated, the local process is interrupted and approval is denied. If the account is validated, the local process is not interrupted.

Figure 11:
FIG. 11 is a representative sampling of features contained in the feature template library.
Figure 11:
Figure 11:
Figure 11:
Figure 11:
Figure 11:
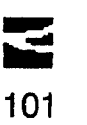
Figure 11:
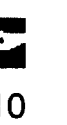
Figure 11:

The fingerprint record whose format is shown in FIG. 8 is decoded. The 2-byte feature code is used as the address to access a unique feature template (similar to one of the templates shown in FIG. 11) from a specially designed feature template library 82. Some examples of feature templates in the feature library are shown in FIG. 11. The template library 82 is stored in ROM. Each template is an array of binary pixels much smaller than the fingerprint image size. For example the fingerprint image may be preferably 560×560 pixels while the template may be 16×16 binary pixels representing a fingerprint feature. The template library may contain up to 65536 unique templates for a 2-byte long address. The use of a template library 82 greatly reduces the amount of data necessary to store on the magnetic strip 44. This makes the system feasible using existing magnetic card technology and therefore minimizes the system cost.

The specified template is retrieved from ROM and correlated with an image area centered on the position specified by the 18-bit position field 68 and 70. The inverted fingerprint image is used if the inverse flag 72 was set. The image matching area is larger in size than the template to allow for deviation in image alignment. For example, a 32×32 pixel region may be associated with each 16×16 pixel feature template. The feature template 44 is positioned successively throughout the image matching area with a correlation value calculated for each template position 84. Analysis of these calculation results determines whether a matching feature was found, and if so, at what location in the image area it was found. A perfect match results in a correlation value of 1. A complete mismatch results in a correlation value of 0. Values in between are analyzed to determine if a feature match has been found. The correlation value and its location are stored in RAM 88. The correlations between the specified image area with slightly rotated versions of the specified feature template is also examined to allow for small rotation error in finger positioning.

The location of the match is compared to the 18-bit position data 68 and 70. Separate X and Y position errors are calculated from the difference in these values. The error values are summed for each subsequent feature correlation and a composite error function is calculated 90. The processes is repeated until all feature frames have been correlated 86.

Decision making 92 is based on both the local matching result 86 and the remote verification result 76. If the remote account verification is negative, the local fingerprint matching process is cancelled immediately. If the account is approved, the process is not interrupted. Once all of the all feature frames have been processed, the resultant correlation values are analyzed along with the position error values to determine whether the fingerprint image adequately matches the fingerprint record. Generally a match is indicated if all of the feature frames correlate at the expected X-Y location.

Allowances for position shift are made in the position error calculation. The operator/proprietor/cardholder is prompted as to the accepted or rejected status of the fingerprint verification.

The decision making criteria may be modified by making program changes which allows some customizing of the process according to level of risk, location or other criteria.

The results of each verification process 94 is stored for future analysis. Data stored includes location, date, time, account number, fingerprint code, status (accepted, rejected, remote accepted, remote rejected).

The enrollment process is initiated when a person applying for a new card/account is instructed by an operator to position his/her appropriate finger in the finger cradle at a proper position, as shown in FIG. 4. The presence of a finger in the finger cradle is sensed through the blocking of the infrared detecting beam 16 that projects from one side wall of the cradle to the other 38, as shown in FIG. 5. The light source 18, image capture device (CCD camera 20) and the card reader 60 are then activated (the light source 18 may stay on all the time if a low power device, for example a LED, is used.)

The user's finger should be placed in the cradle 14 according to the external alignment marks 36 on the side walls 38 of the cradle 14, which is shown in FIG. 4. The image of the fingerprint 132 is formed by the imaging optics 24 and 26 onto the CCD camera 20, as shown in FIG. 5. The CCD camera's position can be adjusted by a stepper motor 28 in order to scan the image for the presence of the first "finger crease" 30, which is used as the alignment reference in the correlation process to ensure that the same portion of the fingerprint is imaged and used in both the enrollment and verification processes. The crease 30 is easily identified as a huge valley area in the lower portion of the fingerprint image. If the finger crease cannot be found in the image range of the CCD camera 20, a message and/or LED signal will be displayed 40 indicating the improper positioning of the finger 12. The user is prompted to re-position his/her finger following the instructions. The positioning process is repeated until the crease 30 is successfully located. Once the finger is properly positioned, several images, FIG. 9b, of the center portion of the fingerprint are then "grabbed" 48. The distance between the first finger crease 30 and the image center is determined. This information is saved as the 2-byte 'C' part 34 of the fingerprint record as shown in FIG. 7. The grabbed images are stored in processor RAM. Each image is preferably a 512×512 pixel array with each pixel value specified by an 8-bit binary code. A code of all zeros represents black. A code of all ones represents white. Other values represent various shades of grey. A grabbed image is digitized into a grey scale image (pixels having values between one and zero) after binarization the image will be assigned black and white values (pixels have values of 1 or 0).

The vertical center of the image is established by determining the distance between the first finger crease 30 and the center of the image area of the encoding system. During the enrollment process, the microprocessor analyzes the image for presence of the crease 98, FIG. 2. If it is not found, the system activates the stepper motor 28 to reposition the CCD camera 20 in the y-direction until the crease 30 is found. Once found, the system calculates the distance between the crease 30 and the center of the original image area. This distance is encoded onto the magnetic strip 34 for use by verification systems. When an individual presents a finger for verification, the verification system locates the first finger crease 30 in the same manner 100, FIG. 1, as the encoding system, FIG. 2. Once located, the verification system then uses the encoded distance value 34 to reposition the CCD camera 20 in the y-direction to the same relative area as was used for encoding.

Images are captured by a frame grabber 46 and stored in either RAM 126 or the frame grabber's internal memory. Frame grabber's vary in sophistication, some units employ a separate micro processor capable of analog to digital conversion, averaging multiple images and running non-linear filtering programs. The grabbed images in RAM 126 (one example is shown in FIG. 9a) are also averaged to reduce random noise 50. A non-linear operation is then performed on the averaged image to increase the contrast ratio and enhance the edges of the gray level image. FIG. 9b shows one example of the processed image. The contrast enhanced image is then binarized 52 by selecting a threshold value and assigning all pixels with values below the threshold a new value of zero and all pixels at or above the threshold a value of one, as shown in FIG. 9c. An inverted 102 copy of the binarized image is also produced, as shown in FIG. 9d. Both copies are stored. An alternative binarization process with thinning effect may be used, which involves two thresholds, one for ridges and the other for valleys of the grey level image. In the direct copy, the pixels with a value greater than the ridge threshold are assigned one while all other pixels assigned zero; in the inverted copy, the pixels with a value less than the valley threshold are assigned one and all the other pixels assigned zero.

The feature library 82 is the key element which allows implementation of a magnetic strip card 58 based system at very low cost. Use of the feature library 82 minimizes the amount of data storage required to an amount that is easily stored on a credit card magnetic strip 44. In addition, use of magnetic strip card devices protects millions of dollars already invested in equipment installed at retail and other locations throughout the world. Each member in the library 82 is uniquely configured to yield maximum correlation for a distinctive fingerprint feature, FIG. 11. The size of the library 82 should be large enough to cover as many as possible of the variations of basic fingerprint features (bifurcations, ridge endings, etc.), but not too large to hinder verification speed and greatly increase the cost. The 2-byte feature code allows access to 65536 different templates.

The feature library 82 is a database of binary pixel arrays, each array representing a unique fingerprint feature. FIG. 11 shows some examples of feature templates in the feature library.

The size of the array may vary, however 16×16 pixel arrays are used in the prototype system. Use of larger arrays allows for higher resolution images, while smaller arrays save storage space and processing time.

Among the most common fingerprint features are bifurcations and ridge endings. In actuality a ridge ending, as shown in Figure 9b, is the equivalent of a bifurcation of valley regions after inversion operation, as shown in FIG. 9d. The feature library 82 contains mostly (but not only) bifurcation and ridge ending templates. Between individual fingerprints, two similar bifurcations will differ in location, orientation, and size. Since the location information is encoded on the card, the feature library need only provide a comprehensive set of bifurcation images across a broad range of sizes and orientations. The image set is constructed using both sampled and artificial images and a variety of image processing techniques.

Figure 10A:
FIG. 10a is a subsection of FIG. 9c containing a feature.
Figure 10B:
FIG. 10b is a subsection of FIG. 9d containing a feature which represents a ridge ending in the original image.

The processed images 50 are each divided 106 into an array of blocks of size larger than that of the feature templates, with the distance between the center of these blocks being the same as the size of the feature templates. This means there is an overlap between these blocks. For example, the size of the blocks may be 24×24 pixels while the size of the feature templates is 16×16 pixels. This means that the 24×24 pixel blocks' centers are separated by 16 pixels. Each block is correlated with every member of the template library 108 to determine if there is any feature contained in the block that matches one of the templates 82. This processes is repeated until all the image blocks have been processed 122. The correlation calculation 104 provides a measure of the degree of similarity between the image block (similar to FIG. 10a) and the library feature (similar to 000 of FIG. 11). Perfect similarity results in a correlation value of 1.0. Complete inversion results in a correlation value of 0.0. All other combinations fall between these extremes. For each image block the feature template(s) yielding a correlation value above certain threshold is identified and the location(s) at which the value(s) occurs is stored. These feature templates 110 are potential candidates to be used to generate registered valid features 118 to generate a final fingerprint record.

Figure 6:
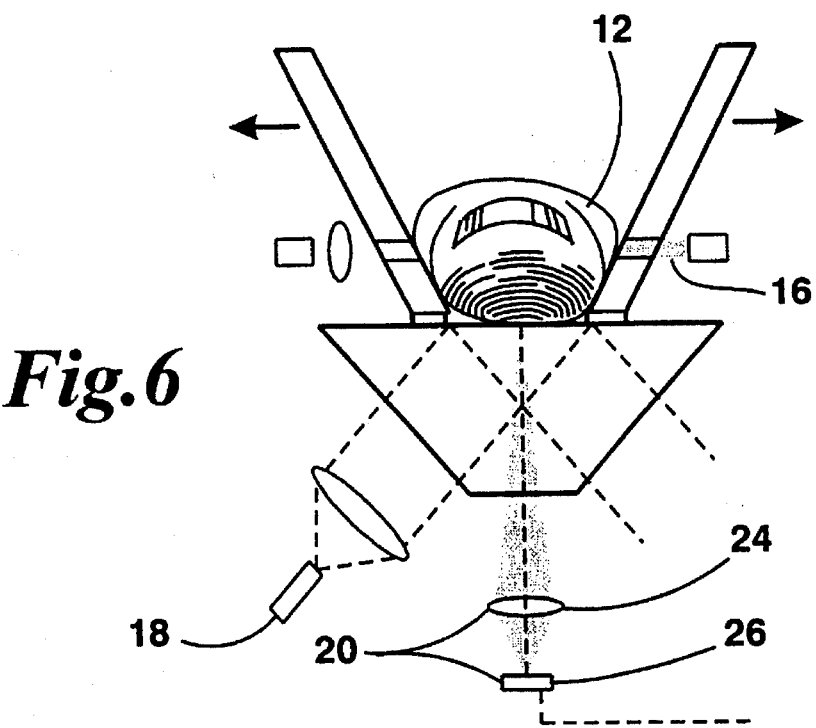
FIG. 6 is a front cross sectional view of the Fingerprint Imaging Device showing the finger in the cradle.

At least 10 feature templates are selected from the stored valid candidate set 110 and used to generate a fingerprint record 112 according to the format shown in FIG. 6. A variety of selection processes may be used for the fingerprint record generation. For example, one selection process may choose the 10 strongest correlations, while another process makes a random selection of valid correlations. This flexibility allows some customization of the system for specific users or applications. The address code of one selected feature template in the library is used as the feature code. This feature code 66 combined with the X-Y location 68 and 70 of the correlation and the inversion flag 72 form one feature frame as shown in FIG. 8. At least 10 such frames are included in one fingerprint record.

The generated fingerprint record is compared against previous enrollments 114 to minimize or eliminate the possibility of duplicate codes. If the generated record does not meet desired uniqueness criteria, a new fingerprint record is generated 116 from the candidate set and analyzed against the uniqueness criteria 114. This step is repeated until a satisfactory record is identified.

Flexibility in setting of uniqueness criteria area allows the system owner to establish their own level of security requirement. While some applications may require complete fingerprint record uniqueness, others may not. This system can be tailored to allow duplicate fingerprint records to be issued to separate individuals who statistically are not likely to interact with each other in a fraudulent manner. This is important when dealing with a potential user base numbering into the tens of millions.

The pixel count, which is shown as the 'C' part 34 in Figure 6, represents the distance between the first finger crease 30 and the center of the fingerprint image during enrollment and is included after the last feature frame to complete a fingerprint record. The final fingerprint record is issued.

ALTERNATIVE EMBODIMENTS

Correlation data can be stored for each transaction 94 and sent to a remote database. When information is sent to the remote location, the actual scanned image, FIG. 9b, can also be sent along with the template information 44 off the identification card 58. This allows the scanned fingerprint information from the retail site to be compared with both the information from the identification card 58 and reference library 82 at the remote site and the information stored at the remote cite for an added measure of security also capability of remote verification.

The level of uniqueness of the fingerprint record assigned to each enrolled individual may be allowed to vary. While certain applications may demand absolutely unique codes for every enrollee, some applications may allow duplication of codes in a predetermined fashion based on statistical or other analyses. Duplication of codes could extend the number of possible enrollees in the system, reduce the number of features used, reduce the processing time for enrollment, or offer some other desired benefit. It should be noted that for the fingerprint verification system, the probability of two persons accidentally access one another's account is zero, which is independent of whether or not duplicate codes are allowed. Even if duplicate codes are issued the sequence in which they are recorded on the magnetic strip can be varied. This allows rejection from the remote location based on the sequencing of the codes on the magnetic strip. However, sufficient deterrent to fraud may still be obtained while allowing some duplication of codes. If the number of duplicate codes is sufficiently small, persons seeking to commit deliberate fraud are sufficiently dissuaded from trying, risking capture in the process. The remote verification step further reduces the probability of a successful fraud attempt to virtually zero. Finally, the very nature of fingerprint recognition acts as a fraud deterrent towards criminal elements which have been previously fingerprinted by the authorities since their fingerprint images can easily be recorded by the system and distributed to hasten their identification and capture.

The fingerprint record is encoded onto a charge card 58 in either one of two methods. The first method uses the conventional magnetic strip found on the back of today's charge cards. A binary data stream representing a fingerprint record is stored in the strip by magnetizing the magnetic media. The data may be encrypted for additional security. The data density of this method is low (usually <100 bits/cm).

The second method uses optical recording technology in which the fingerprint record data is recorded onto a magneto-optic film through thermal-magnetic effect and read out using a magneto-optic effect such as Kerr or Faraday effect. This method can achieve a very high data density, therefore a longer fingerprint record containing more feature frames can be stored in a card. Alternatively, instead of the fingerprint record being stored in a card, the encrypted bit-map of subsections of a person's binarized fingerprint image can be stored directly so that the locally maintained feature library 82 can be eliminated. At its extreme, the encrypted bit-map of a whole fingerprint image that has been preprocessed and binarized can be recorded and read out using the magneto-optic method. A unique number is also encrypted into the fingerprint bit-map for remote verification during which process this number is decoded and transmitted back to the remote system for confirmation of the match between the fingerprint bit-map and the specified account. The match between the card holder's fingerprint and the fingerprint bit-map image decoded from the card is performed locally using one of the pre-existing methods.

While this application describes the use of the fingerprint for verification it should be noted that any epidermis print (such as a toe, palm of the hand, a portion of the back) may be easily adapted to the described method and apparatus. Additional alternative fingers may be enrolled for added security.

While this application describes the use of a magnetic strip for recording information used in verification it should be noted that a bar code could be substituted for the magnetic strip. The only additional hardware involved would be an optical scanner configured to read bar code. Such scanners are readily found in supermarkets and banking institutions. This could be used with paper documents where security is an issue. For example a state bar examination could be encoded with the fingerprint of the applicant to insure that the registered applicant is the exam taker.

This system would be used for credit cards, charge cards, debit cards, ATM cards, or any other type of identification card which may be subject to fraud. Using this system, authorized personnel can access high security buildings or facilities, files, sensitive information, or secured files on computers.

This system could be used by insurance companies, the Department of Motor Vehicles (DMV), Immigration and Naturalization Services (INS), and other government agencies which are subject to fraud. This system can be used for passports, checks, or any other official documents. This system could also be utilized wherever there is a need for security or restricted access, such as homes, cars, hotel rooms, or office buildings.

Throughout this specification, the identification card is referred to as a charge card, but any type of magnetic strip identification card can employ this verification method. For example, it has been said that one problem with a system of national welfare is fraud. This described identification system could be utilized to make sure only the proper recipients are issued checks. The system can be used to issue magnetic strip keys to cars, hotel rooms, file rooms, buildings, or homes the possibilities are endless. Automatic Teller Machine fraud is a serious problem which the system described above can be adapted to.

Medical history profiles could also be encoded with fingerprint identification information.

This would allow paramedics to positively match a medical history profile recorded on a card with an unconscious body at the scene of an accident.

SUMMARY OF THE ACHIEVEMENT OF THE OBJECTS OF THE INVENTION

From the foregoing, it is readily apparent that we have invented an improved method and apparatus for verifying that a card holder is the card owner by matching the image of the card holder's fingerprint to the unique code which has been derived from a fingerprint taken previously from the same finger and assigned to the card owner and encoded on the card's magnetic strip. Further a method of fingerprint verification which only requires a relatively small amount of data to perform identification has been disclosed, making it possible to use low cost, low density encoding methods including bar code and magnetic strip. This invention also teaches the configuration of apparatus for fingerprint verification which provide quick and accurate identification. Our invention is unique in that it records selective information that enables unique identification even with an enormous number of subjects.

It is to be understood that the foregoing description and special embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method for adding individuals to a system which confirms the identity of an individual presenting an identification card comprising:

providing a central processing unit;

providing a preselected feature template library in communication with said central processing unit;

scanning preselected portions of an epidermis to provide a scanned image, and sending said scanned image to said central processing unit;

wherein said scanning step comprises:
providing a finger cradle;
operatively associating an imaging system with said finger cradle;
operatively associating a charged couple device camera with said imaging system;
operatively associating a frame grabber with said charged couple device camera;
operatively associating a stepper motor with said charged couple device camera;
operatively associating a control interface with said stepper motor and said central processing unit; and
operatively associating a position detector with said control interface;

dividing said scanned image into an array of image blocks;

correlating each image block with each feature stored in said preselected feature template library;

identifying and selecting features of said epidermis by said central processing unit;

determining a reference code corresponding to features contained in said feature template library for each feature selected by said central processing unit;

encoding said reference code on an identification card; and recording said reference code at a centralized data bank;

said central processing unit generating a signal to said stepper motor to adjust said charged couple device camera to locate a distinctive reference position on preselected portions of an epidermis, and said central processing unit generating a distinctive position code corresponding to a distance between said distinctive reference position and a center portion of said preselected portions of said epidermis;

said charged couple device camera generating an analog video image of said preselected portions of an epidermis;

said charged couple device camera generating several video images of said preselected portions of an epidermis;

averaging each of said video images with other of said video images to produce a single video image, and temporarily saving said single video image.

2. A method, according to claim 1, further comprising:
filtering said video images employing a non-linear filter thereby creating a filtered image and converting said filtered image into a binary image.

3. A method, according to claim 2, wherein:
said central processing unit is adapted to invert said binary image as an inverted binary image and to generate an inverse flag code, said inverted binary image and said inverse flag code being temporarily saved in said central processing unit.

4. A method, according to claim 3, wherein:

said feature template library contains a plurality of predetermined binarized features, each of said plurality of predetermined binarized features having a feature code.

5. A method, according to claim 4, wherein:

said binary image is divided up into a plurality of overlapping small sections, each of said small sections being correlated with each of said plurality of predetermined binarized features contained in said template library to determine a degree of similarity between features contained in said small sections and each of said plurality of predetermined binarized features in said template library, each of said plurality of predetermined binarized features being assigned a correlation value corresponding to its said degree of similarity with said features contained in said small sections and assigned a location value indicating a position of said feature within each of said small sections.

6. A method, according to claim 5, wherein:

said inverted binary image is divided into a plurality of overlapping small sections, each of said small sections being correlated with each of said plurality of predetermined binarized features in said template library to determine a degree of similarity between features contained in each of said small sections and each of said plurality of predetermined binarized features in said template library, each of said plurality of predetermined binarized features being assigned a correlation value corresponding to its said degree of similarity with said features contained in said small sections and assigned a location value indicating the position of said feature within each of said small sections, and an inverse flag code indicating an inverted binary image as a source of each of said small sections.

7. A method, according to claim 6, wherein:

said central processing unit compares each of said plurality of predetermined binarized features' correlation value with a threshold value, each of said plurality of predetermined binarized feature having a correlation value above said threshold value being stored in the central processing unit.

8. A method, according to claim 7, wherein:

said central processing unit is adapted to select a plurality of predetermined binarized features based on a predetermined criteria and thereby form a candidate epidermis record.

9. A method, according to claim 8, wherein:

said central processing unit is adapted to select a plurality of predetermined binarized features based on the highest threshold value and thereby form a candidate epidermis record.

10. A method, according to claim 8, wherein:

said central processing unit is adapted to randomly select a plurality of predetermined binarized features and thereby form a candidate epidermis record.

11. A method, according to claim 8, wherein:

said central processing unit is adapted to compare said candidate epidermis record with other epidermis records.

12. A method, according to claim 11, wherein:

said central processing unit is adapted to select a distinctive candidate epidermis record.

13. A method, according to claim 12, wherein:

said distinctive candidate epidermis record contains said feature code of each of said plurality of predetermined binarized features, a location code corresponding to a location of said feature within said binary image, said inverse flag code and said location code.

14. A method, according to claim 13, wherein:

said central processing unit is adapted to forward said distinctive candidate epidermis record to an encoder for encoding of said distinctive epidermis record onto said identification card.

15. A method, according to claim 14, wherein:

a card reader engages said identification card and receives said distinctive epidermis record and transmits said distinctive epidermis record to said central processing unit.

16. A method for confirming the identity of an individual cardholder presenting an identification card, comprising:

providing a predetermined feature template library containing a plurality of feature templates and corresponding feature codes;

providing an identification card containing information regarding a preselected portion of the cardholder's epidermis and codes corresponding to feature codes in said feature template library;

scanning a preselected portion of said cardholder's epidermis and temporarily storing the results of the scan as temporary results;

reading said information from said identification card;

comparing said temporary results with the information read from said card, and generating a comparison;

determining a correlation between the information scanned and the information contained on said card; and displaying results of said correlation, thereby indicating whether to accept the identity of said cardholder;

generating a signal to a stepper motor to adjust a charge coupled device camera to locate a distinctive reference position on preselected portions of an epidermis, and generating a distinctive position code corresponding to a distance between said distinctive reference position and a center portion of said preselected portion of an epidermis;

said charge coupled device camera generating an analog video image of said preselected portions of an epidermis; and said charge coupled device camera generating several video images of said preselected portions of an epidermis; and averaging each of said video images with other of said video images to produce a single video image, and temporarily saving said single video image.

17. A method according to claim 16, further comprising:

filtering said video image employing a non-linear filter thereby creating a filtered image and converting said filtered image into a binary image.

18. A method according to claim 17, further comprising:

inverting said binary image as an inverted binary image and temporarily saving said inverted binary image in the central processing unit.

19. A method according to claim 18, wherein:

said feature template library contains a plurality of predetermined binarized features, each of said plurality of predetermined binarized feature having a one of a plurality of feature codes, further comprising dividing said binary image into a plurality of overlapping small sections, correlating each of said small sections with a feature template corresponding to a feature code contained in said feature template library to determine a degree of similarity between features contained in each of said small sections and features specified by said feature codes contained in said feature template library, assigning a correlation value to each of said plurality of predetermined binarized features corresponding to its said degree of similarity with said features contained in each of said small sections, and assigning a location value indicating a position of said feature within each of said small sections.

20. A method according to claim 19, wherein:

said inverted binary image is divided into a plurality of overlapping small sections, each of said small sections being correlated with a feature template corresponding to feature code in said feature template library to determine a degree of similarity between features contained in each of said small sections and features specified by said feature codes in said feature template library, each predetermined binarized feature being assigned a correlation value corresponding to its said degree of similarity with said features contained in each of said small sections and assigned a location value indicating the position of said features within each of said small sections.

* * * * *